US010020659B2

(12) United States Patent
Aurongzeb et al.

(10) Patent No.: US 10,020,659 B2
(45) Date of Patent: Jul. 10, 2018

(54) SYSTEMS AND METHODS FOR DYNAMIC WIRELESS CHARGING COMPENSATION

(71) Applicant: Dell Products L.P., Round Rock, TX (US)

(72) Inventors: Deeder M. Aurongzeb, Austin, TX (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 14/931,404

(22) Filed: Nov. 3, 2015

(65) Prior Publication Data
US 2017/0126020 A1    May 4, 2017

(51) Int. Cl.
*H02J 5/00*    (2016.01)

(52) U.S. Cl.
CPC .................................... *H02J 5/005* (2013.01)

(58) Field of Classification Search
None
See application file for complete search history.

(56) References Cited

U.S. PATENT DOCUMENTS

| 8,090,550 B2 | 1/2012 | Azancot et al. |
| 2013/0127406 A1* | 5/2013 | Winger .................. H02J 7/025 320/108 |
| 2014/0334076 A1 | 11/2014 | Baldwin |

OTHER PUBLICATIONS

Zierhofer, C.M, Geometric Approach for Coupling Enhancement of Magnetically Coupled Coils, IEEE Transactions on Biomedical Engineering, vol. 43, No. 7, Jul. 1996, pp. 708-714.

* cited by examiner

*Primary Examiner* — Jared Fureman
*Assistant Examiner* — Aqeel Bukhari
(74) *Attorney, Agent, or Firm* — Jackson Walker L.L.P.

(57) ABSTRACT

A charging pad may include a transmit coil comprising a plurality of segments of conductive material, one or more segment switches, each segment switch configured to electrically couple two of the plurality of segments together when such segment switch is activated and electrically isolate the two of the plurality of segments when such segment switch is deactivated, one or more power source switches configured to selectively electrically couple a tap point of one of the plurality of segments to a first terminal of a power source, and a coil control system configured to generate one or more control signals based on one or more physical parameters associated with the charging pad, the control signals for selectively enabling and disabling the one or more segment switches and the one or more power source switches in order to select an active path of the transmit coil based on the physical parameters.

18 Claims, 3 Drawing Sheets

SYSTEMS AND METHODS FOR DYNAMIC WIRELESS CHARGING COMPENSATION

TECHNICAL FIELD

The present disclosure relates in general to information handling systems, and more particularly to wireless charging of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly becoming capable of being charged wirelessly, including inductive and resonant charging methods, as opposed to more traditional charging methods in which an information handling system is charged via a wire or cable coupled to the information handling system. Such wireless charging technologies have inherent tradeoffs with respect to efficiency, delivered power, multi-device charging, and thermal performance. High-power and multi-device transmit charging pads often require relatively large transmit coil areas to deliver the necessary energy for high-power devices and also to enable charging of multiple devices. However, a large transmit coil may reduce efficiency for smaller devices and may also increase electromagnetic interference to the information handling system or other devices external to the transmit charging pad.

In addition, coil size of a receiving information handling system and a user's alignment of the device are not predictable, which often motivates use of a larger charging area. A larger charging area for the transmit charging pad may reduce efficiency in the charging system due to the aspect ratio between the transmit coil and the receive coil.

SUMMARY

In accordance with the teachings of the present disclosure, the disadvantages and problems associated with traditional approaches to wireless charging of information handling resources may be substantially reduced or eliminated.

In accordance with embodiments of the present disclosure, a charging pad may include a transmit coil comprising a plurality of segments of conductive material, one or more segment switches, each segment switch configured to electrically couple two of the plurality of segments together when such segment switch is activated and electrically isolate the two of the plurality of segments when such segment switch is deactivated, one or more power source switches configured to selectively electrically couple a tap point of one of the plurality of segments to a first terminal of a power source, and a coil control system configured to generate one or more control signals based on one or more physical parameters associated with the charging pad, the control signals for selectively enabling and disabling the one or more segment switches and the one or more power source switches in order to select an active path of the transmit coil based on the one or more physical parameters.

In accordance with these and other embodiments of the present disclosure, a coil control system may include one or more measurement modules for measuring one or more physical parameters associated with a device and a control module configured to generate one or more control signals based on one or more physical parameters associated with the device, the control signals for selecting an active path of a coil of the device based on the one or more physical parameters.

In accordance with these and other embodiments of the present disclosure, a method may include determining one or more physical parameters associated with a device, and generating one or more control signals based on one or more physical parameters associated with the device, the control signals for selecting an active path of a coil of the device based on the one or more physical parameters.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
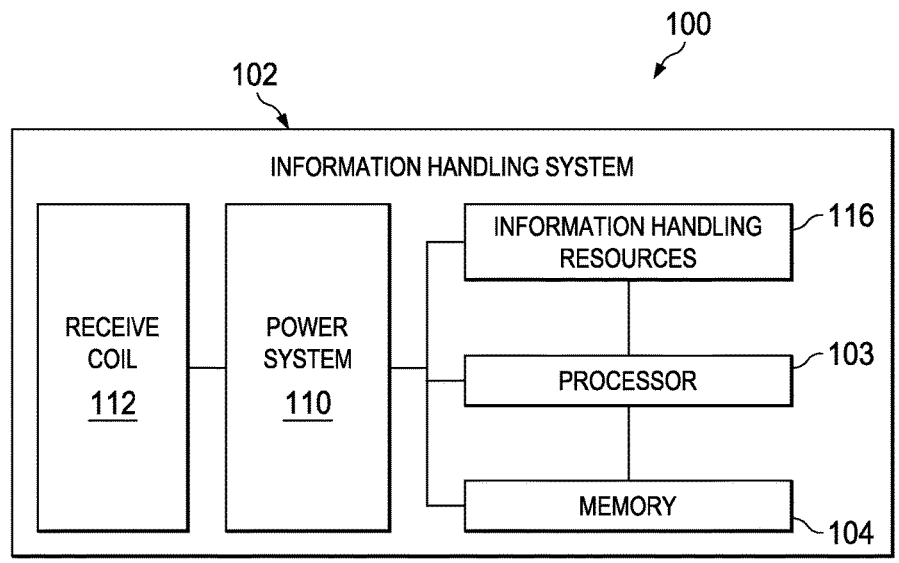
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may be a personal computer (e.g., a desktop computer, a laptop, notebook, tablet, handheld, smart phone, personal digital assistant, etc.). As depicted in FIG. 1, information handling system 102 may include an enclosure 100 housing a plurality of information handling resources including, without limitation, processor 103, a memory 104 communicatively coupled to processor 103, a power system 110 coupled to a receive coil 112, and one or more other information handling resources 116 communicatively coupled to processor 103.

Enclosure 100 may comprise an enclosure that serves as a container for various information handling systems and/or information handling resources, and may be constructed from steel, aluminum, plastic, and/or any other suitable material. Although the term "enclosure" is used, enclosure 100 may also be referred to as a case, cabinet, tower, box, chassis, and/or housing. In certain embodiments, enclosure 100 may be configured to hold and/or provide power to a plurality of information handling systems and/or information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Generally speaking, power system 110 may include any system, device, or apparatus configured to supply electrical current to one or more of processor 103, memory 104, and information handling resources 116. In some embodiments, power system 110 may include a battery for storing electrical energy or electrochemical energy.

Receive coil 112 may be electrically coupled to power system 110 and may comprise any system, device, or apparatus configured to inductively couple to a corresponding transmit coil of a charging pad in order to receive inductively transmitted electrical energy from the transmit coil and to deliver such received electrical energy to power system 110 (e.g., for charging a battery of power system 110).

Generally speaking, information handling resources 116 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

Figure 2:
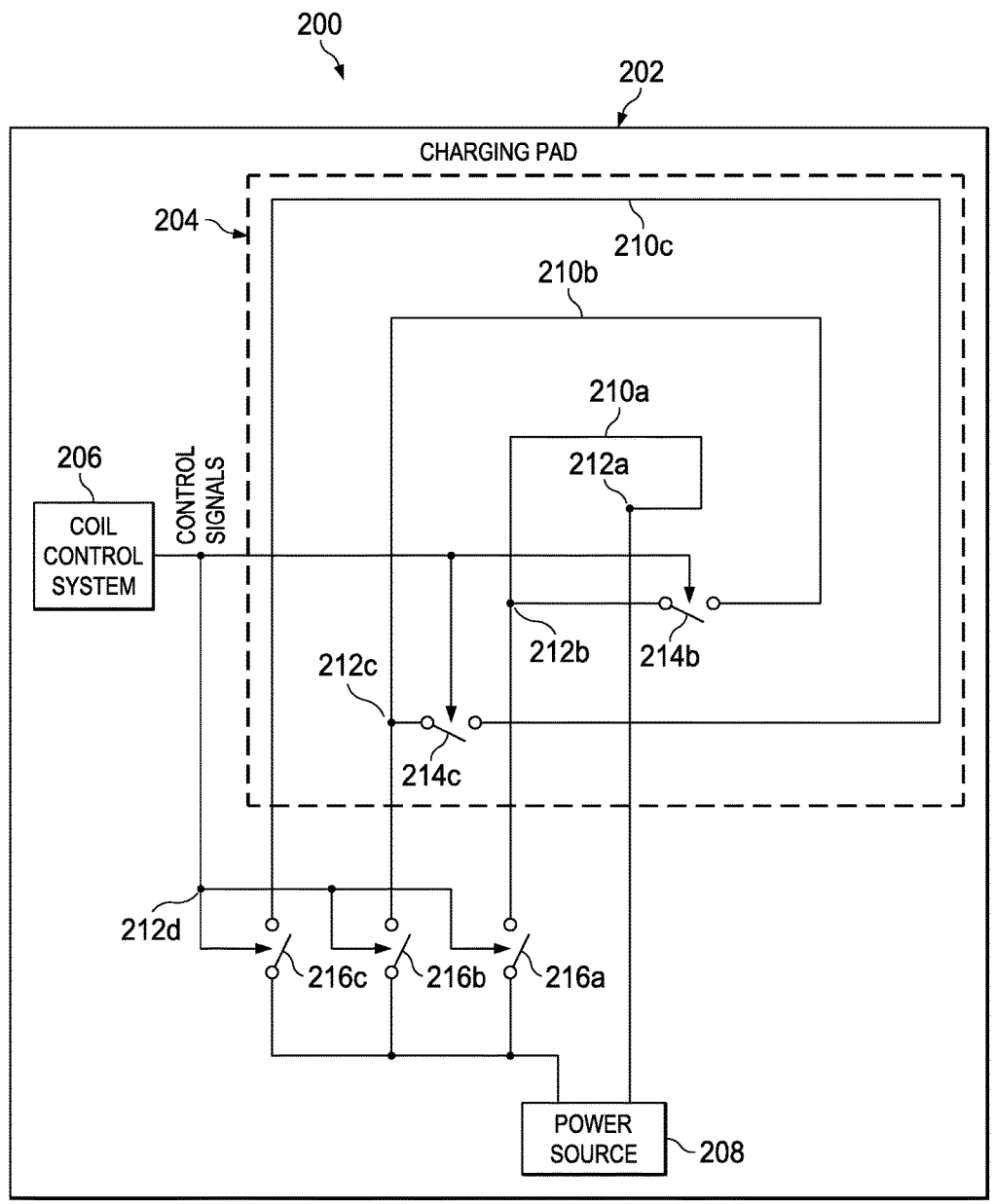
FIG. 2 illustrates a block diagram of an example charging pad, in accordance with embodiments of the present disclosure.

FIG. 2 illustrates a block diagram of an example charging pad 202, in accordance with embodiments of the present disclosure. As shown in FIG. 2, charging pad 202 may include an enclosure 200, a transmit coil 204, a coil control system 206, and a power source 208.

Enclosure 200 may comprise an enclosure that serves as a container for various components of charging pad 202, and may be constructed from steel, aluminum, plastic, and/or any other suitable material. In some embodiments, enclosure 200 may be at least partially constructed from ferrite-based carbon nanotube composite and/or polymeric composite. Although the term "enclosure" is used, enclosure 200 may also be referred to as a case, cabinet, box, chassis, and/or housing.

Transmit coil 204 may be electrically coupled to power source 208 and may comprise any system, device, or apparatus configured to inductively couple to a corresponding receive coil (e.g., receive coil 112) of an information handling system 102 in order to inductively transmit electrical energy from transmit coil 204 and to the receive coil. As shown in FIG. 2, transmit coil 204 may include a plurality of segments 210. For example, in the embodiments represented by FIG. 2, a first segment 210a may include electrically conductive material (e.g., a metal, carbon fiber, carbon nanotube) that spans from a first tap point 212a to a second tap point 212b, a second segment 210b may include electrically conductive material (e.g., a metal, carbon fiber, carbon nanotube) that spans from second tap point 212b to a third tap point 212c, and a third segment 210c may include electrically conductive material (e.g., a metal, carbon fiber, carbon nanotube) that spans from third tap point 212c to a fourth tap point 212d. Although transmit coil 204 is depicted in FIG. 2 as having three segments 210a, 210b, and 210c, in other embodiments transmit coil 204 may include any suitable number of segments 210.

In some embodiments, the various segments 210 of transmit coil 204 may comprise the same material. However, in other embodiments, one or more segments 210 may comprise a different material than that of another segment 210. For example, one or more 210 segments may comprise copper or other metal while one or more other segments may comprise carbon fiber. By having segments 210 of different materials (e.g., different dielectric properties), electrical properties (e.g., resonant frequencies) of transmit coil 204 may be controlled based on which segments 210 are selected to be within an active path (as described below) of transmit coil 204.

As shown in FIG. 2, one or more segments 210 of transmit coil 204 may include segment switches 214. A segment switch 214 may comprise any electrical component that may complete or break an electrical circuit based on a control signal (e.g., a control signal communicated from coil control system 206) provided to segment switch 214. For example, a segment switch 214 may be activated (e.g., enabled, closed, turned on) in which case such segment switch 214 may complete an electrical circuit between two segments 210 of transmit coil 204, or may be deactivated (e.g., disabled, open, turned off) in which case such segment switch 214 may break an electrical circuit between two segments 210 of transmit coil 204.

Also as shown in FIG. 2, charging pad 202 may also include power source switches 216 coupled between a single terminal of power source 208 and individual tap points 212 of transmit coil 204. A power source switch 216 may comprise any electrical component that may complete or break an electrical circuit based on a control signal (e.g., a control signal communicated from coil control system 206) provided to segment switch 214. For example, a power source switch 216 may be activated (e.g., enabled, closed, turned on) in which case such power source switch 216 may complete an electrical circuit between a particular tap point 212 of transmit coil 204 and a first terminal of power source 208, or may be deactivated (e.g., disabled, open, turned off) in which case such power source switch 216 may break an electrical circuit between a particular tap point 212 of transmit coil 204 and the first terminal of power source 208. As a further example, in the embodiments represented by FIG. 2, a first power source switch 216a may be coupled between tap point 212b of transmit coil 204 and a first terminal of power source 208, a second power source switch 216b may be coupled between tap point 212c of transmit coil 204 and the first terminal of power source 208, and a third power source switch 216c may be coupled between tap point 212d of transmit coil 204 and the first terminal of power source 208. Regardless of the states of power source switches 216, a second terminal of power source 208 may electrically couple to tap point 212a of transmit coil 204. Although charging pad 202 is depicted in FIG. 2 as having three power source switches 216a, 216b, and 216c, in other embodiments charging pad 202 may include any suitable number of power source switches 216.

Coil control system 206 may comprise any system, device, or apparatus configured to, based on one or more detected and/or sensed physical parameters, generate control signals for controlling segment switches 214 and power source switches 216 in order to select an active path of transmit coil 204 (which may define an area of a surface of charging pad 202 from which electrical energy may be transmitted from charging pad 202). For example, by deactivating segment switches 214b and 214c, activating power source switch 216a, and deactivating power source switches 216b and 216c, an active path for electrical current between the terminals of power source 208 may include first segment 210a. As another example, by activating segment switch 214b, deactivating segment switch 214c, activating power source switch 216b, and deactivating power source switches 216a and 216c, an active path for electrical current between the terminals of power source 208 may include first segment 210a and second segment 210b. As a further example, by activating segment switches 214b and 214c, activating power source switch 216c, and deactivating power source switches 216a and 216b, an active path for electrical current between the terminals of power source 208 may include first segment 210a, second segment 210b, and third segment 210c. Example structure and functionality of coil control system 206 is described in greater detail below with respect to FIG. 4.

Generally speaking, power source 208 may include any system, device, or apparatus configured to supply electrical current to an active path of transmit coil 204.

Figure 3:
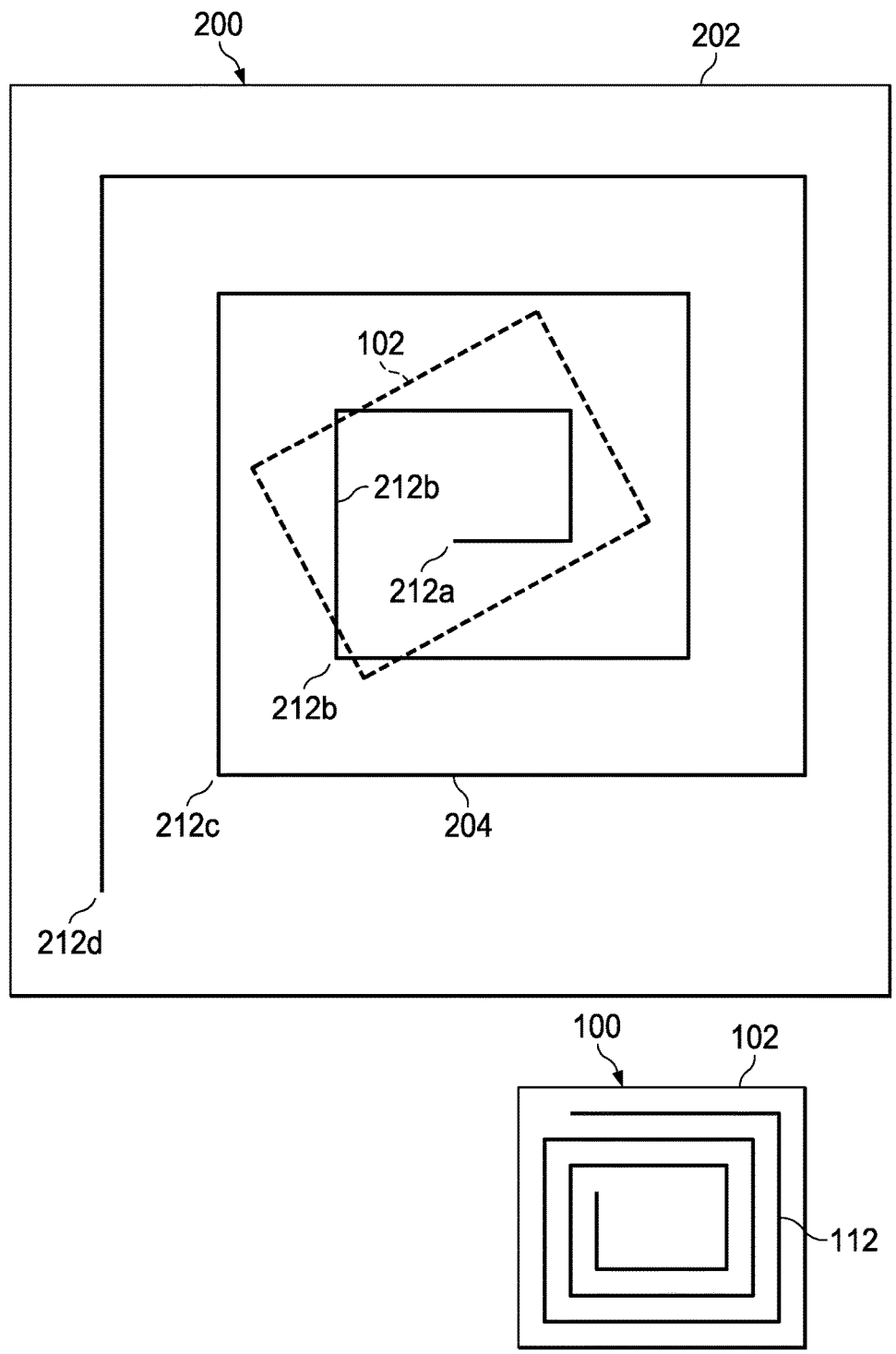
FIG. 3 illustrates a plan view of selected components of an information handling system and a charging pad, in accordance with embodiments of the present disclosure.

FIG. 3 illustrates a plan view of selected components of information handling system 102 and charging pad 202, in accordance with embodiments of the present disclosure, depicting an example of the relative footprints of receive coil 112 to enclosure 100 and transmit coil 204 to enclosure 200. With respect to information handling system 102, enclosure 100 and receive coil 112 are shown, and other components of information handling system 102 are not shown, for purposes of clarity and exposition. With respect to charging pad 202, enclosure 200, transmit coil 204, and tap points 212 are shown, but other components of charging pad 202 are not shown, for purposes of clarity and exposition. To wirelessly charge information handling system 102, a user may place information handling system 102 on charging pad 202 (e.g., as shown by the dashed rectangle in FIG. 3), which may cause transmit coil 204 to inductively transmit electrical energy to receive coil 112, which receive coil 112 may deliver to power system 110.

In the foregoing discussion, it has been contemplated that transmit coil 204 may be segmented. However, in these and other embodiments, receive coil 112 may be segmented in a manner similar or identical to that depicted above with respect to transmit coil 204.

Figure 4:
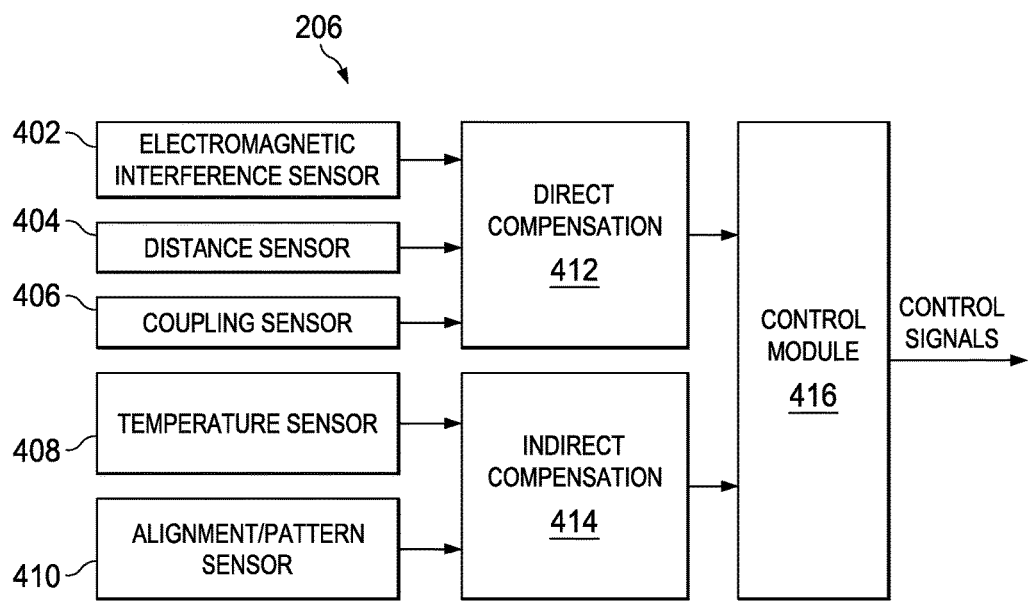
FIG. 4 illustrates an example functional block diagram of a coil control circuit, in accordance with embodiments of the present disclosure.

FIG. 4 illustrates an example functional block diagram of coil control circuit 206, in accordance with embodiments of the present disclosure. As shown in FIG. 4, coil control system 206 may include an electromagnetic interference sensor 402, a distance sensor 404, a coupling sensor 406, a temperature sensor 408, an alignment/pattern sensor 410, a direct compensation module 412, an indirect compensation module 414, and a control module 416.

Electromagnetic interference sensor 402 may comprise any system, device, or apparatus configured to determine an amount of electromagnetic interference radiated by transmit coil 204 to components of information handling system 102 other than receive coil 112 or devices other than charging pad 202 and information handling system 102. In some embodiments, an indication of electromagnetic interference radiated by transmit coil 204 may be sensed by a component of information handling system 102 and communicated to electromagnetic interference sensor 402 via a wireless communication signal (e.g., BLUETOOTH).

Distance sensor 404 may comprise any system, device, or apparatus configured to determine a physical distance between transmit coil 204 and receive coil 112. For example, the presence of a cover or case on information handling system 102 may increase a distance between transmit coil 204 and receive coil 112 as compared to the same information handling system 102 without such cover or case. In some embodiments, an indication of distance may be sensed by a component of information handling system 102 and communicated to distance sensor 404 via a wireless communication signal (e.g., BLUETOOTH).

Coupling sensor 406 may comprise any system, device, or apparatus configured to determine a degree of inductive coupling between transmit coil 204 and receive coil 112. In some embodiments, an indication of inductive coupling may be sensed by a component of information handling system 102 and communicated to coupling sensor 406 via a wireless communication signal (e.g., BLUETOOTH). In other embodiments, coupling sensor 406 may be present in charging pad 202.

Temperature sensor 408 may comprise any system, device, or apparatus (e.g., a thermometer, thermistor, etc.) configured to communicate a signal indicative of a temperature associated with information handling system 102 and/or charging pad 202. In some embodiments, an indication of temperature may be sensed by a component of information handling system 102 and communicated to temperature sensor 408 via a wireless communication signal (e.g., BLUETOOTH).

Alignment/pattern sensor 410 may comprise any system, device, or apparatus configured to determine an alignment and/or pattern (e.g., footprint) of an information handling system 102 on a surface of charging pad 202. For example, alignment/pattern sensor 410 may be indicative of the presence of objects (e.g., other devices, metals, foreign objects) other than an information handling system 102 in proximity to charging pad 202 which may affect efficiency of transmission. In some embodiments, an indication of alignment and/or pattern may be sensed by a component of information handling system 102 and communicated to alignment/pattern sensor 410 via a wireless communication signal (e.g., BLUETOOTH). In other embodiments, alignment/pattern sensor 410 may be present in charging pad 202.

Although specific sensors have been enumerated above, coil control system 406 may utilize one or more other sensors for measuring one or more other physical quantities in order to generate control signals.

Direct compensation module 412 may comprise any system, device, or apparatus configured to, based on information obtained from electromagnetic interference sensor 402, distance sensor 404, coupling sensor 406, and/or one or more other sensors, generate a direct compensation signal. Direct compensation may be a "fast" feedback-based compensation, as the types of physical quantities used by direct compensation module 412 may be obtained quickly and thus be used to quickly provide compensation and/or control in response thereto. As examples of direct compensation, the active path of transmit coil 204 may be increased for lower levels of electromagnetic interference, higher amounts of distance, and lower amounts of coupling and may be decreased for higher levels of electromagnetic interference, higher amounts of distance, and higher amounts of coupling.

Indirect compensation module 414 may comprise any system, device, or apparatus configured to, based on information obtained from electromagnetic interference temperature sensor 408, alignment/pattern sensor 410, and/or one or more other sensors, generate an indirect compensation signal. Indirect compensation may be a "slow" feedback-based compensation, as the types of physical quantities used by indirect compensation module 412 may be obtained and/or may change slowly (e.g., temperature may rise or fall slowly) and thus control in response to such physical quantities may be slower than that of direct compensation. As examples of indirect compensation, the active path of transmit coil 204 may be increased for lower levels of sensed temperature and for lower degrees of alignment and may be decreased for higher levels of sensed temperature and for higher degrees of alignment.

Control module 416 may receive the direct compensation signal and the indirect compensation signal and based thereon, generate one or more control signals to set an active path of transmit coil 204, as described above.

As used herein, when two or more elements are referred to as "coupled" to one another, such term indicates that such two or more elements are in electronic communication, thermal communication, or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A coil control system comprising:
   one or more measurement modules for measuring physical parameters associated with a device;
   a direct compensation module configured to determine at least one first physical parameter selected from the group consisting of: electromagnetic interference, distance, and coupling;
   an indirect compensation module configured to determine at least one second physical parameter selected from the group consisting of: temperature and alignment; and
   a control module configured to generate one or more control signals based on physical parameters associated with the device and including the at least one first physical parameter and the at least one second physical parameter, the control signals for selecting an active path of a coil of the device based on the physical parameters.

2. The coil control system of claim 1, wherein the one or more control signals are for controlling:
one or more segment switches, each segment switch configured to electrically couple two of a plurality of segments of conductive material together when such segment switch is activated and electrically isolate the two of the plurality of segments when such segment switch is deactivated; and
one or more power source switches configured to selectively electrically couple a tap point of one of the plurality of segments to a first terminal of a power source.

3. The coil control system of claim 1, wherein the electromagnetic interference is an amount of electromagnetic interference transmitted by the coil, the distance is a distance between the coil and a corresponding second coil of a second device, and the coupling is a degree of inductive coupling between the coil and the corresponding second coil.

4. The coil control system of claim 1, wherein the temperature is a temperature associated with the device.

5. The coil control system of claim 4, the one or more measurement modules configured to receive a signal indicative of the temperature from a second device having a corresponding second coil inductively coupled to the coil.

6. The coil control system of claim 1, wherein the alignment is a physical alignment between the coil and a corresponding second coil of a second device.

7. The coil control system of claim 6, the one or more measurement modules configured to receive a signal indicative of the alignment from the second device.

8. The coil control system of claim 1, wherein the device comprises a charging pad, and the coil is a transmit coil for inductively transmitting electrical energy to a corresponding receive coil.

9. The coil control system of claim 1, wherein the device comprises an information handling system and the coil comprises a receive coil for inductively receiving electrical energy transmitted from a corresponding transmit coil.

10. A method comprising:
determining one or more physical parameters associated with a device;
determining, at a direct compensation module, at least one first physical parameter selected from the group consisting of: electromagnetic interference, distance, and coupling;
determining, at an indirect compensation module, at least one second physical parameter selected from the group consisting of: temperature and alignment; and
generating one or more control signals based on physical parameters associated with the device and including the at least one first physical parameter and the at least one second physical parameter, the control signals for selecting an active path of a coil of the device based on the physical parameters.

11. The method of claim 10, wherein the one or more control signals are for controlling:
one or more segment switches, each segment switch configured to electrically couple two of a plurality of segments of conductive material together when such segment switch is activated and electrically isolate the two of the plurality of segments when such segment switch is deactivated; and
one or more power source switches configured to selectively electrically couple a tap point of one of the plurality of segments to a first terminal of a power source.

12. The method of claim 10, wherein the electromagnetic interference is an amount of electromagnetic interference transmitted by the coil, the distance is a distance between the coil and a corresponding second coil of a second device, and the coupling is a degree of inductive coupling between the coil and the corresponding second coil.

13. The method of claim 10, wherein the temperature is a temperature associated with the device.

14. The method of claim 13, further comprising receiving a signal indicative of the temperature from a second device having a second coil inductively coupled to the coil.

15. The method of claim 10, wherein the alignment is a physical alignment between the coil and a corresponding second coil of a second device.

16. The method of claim 15, further comprising receiving a signal indicative of the alignment from the second device.

17. The method of claim 10, wherein the device comprises a charging pad, and the coil is a transmit coil for inductively transmitting electrical energy to a corresponding receive coil.

18. The method of claim 10, wherein the device comprises an information handling system and the coil comprises a receive coil for inductively receiving electrical energy transmitted from a corresponding transmit coil.

\* \* \* \* \*